US009312964B2

(12) United States Patent  
Liu et al.

(10) Patent No.: US 9,312,964 B2  
(45) Date of Patent: Apr. 12, 2016

(54) RECONSTRUCTION AND RESTORATION OF AN OPTICAL SIGNAL FIELD

(75) Inventors: Xiang Liu, Marlboro, NJ (US); Xing Wei, Dublin, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1659 days.

(21) Appl. No.: 11/525,786

(22) Filed: Sep. 22, 2006

(65) Prior Publication Data

US 2008/0075472 A1    Mar. 27, 2008

(51) Int. Cl.
| H04B 10/60 | (2013.01) |
| H04B 10/516 | (2013.01) |
| H04B 10/67 | (2013.01) |

(52) U.S. Cl.
CPC ............ *H04B 10/60* (2013.01); *H04B 10/5161* (2013.01); *H04B 10/677* (2013.01)

(58) Field of Classification Search
CPC ............. H04B 10/677; H04B 10/5161; H04B 10/541; H04B 10/5561; H04B 10/60; H04B 10/61; H04B 10/63; H04B 10/64
USPC .................... 398/65, 136, 147, 152, 208, 205, 398/202–204, 214
See application file for complete search history.

(56) References Cited

U.S. PATENT DOCUMENTS

| 7,003,120 | B1 * | 2/2006 | Smith et al. ...................... 381/61 |
| 7,529,490 | B2 * | 5/2009 | Hoshida ................ H04B 10/532 398/202 |
| 7,623,796 | B2 * | 11/2009 | Liu ......................... H04B 10/66 398/183 |
| 8,855,503 | B2 * | 10/2014 | Kikuchi ............... H04B 10/677 398/208 |
| 2004/0114939 | A1 * | 6/2004 | Taylor ........................... 398/152 |
| 2004/0218932 | A1 * | 11/2004 | Epworth ............ H04B 10/2513 398/202 |
| 2005/0069329 | A1 * | 3/2005 | Giles et al. ..................... 398/188 |
| 2005/0069330 | A1 * | 3/2005 | Kao et al. ....................... 398/188 |
| 2005/0141406 | A1 * | 6/2005 | Maltsev et al. ................ 370/203 |
| 2007/0060077 | A1 * | 3/2007 | Qian .............................. 455/130 |

(Continued)

FOREIGN PATENT DOCUMENTS

| EP | 1 641 152 A1 | 3/2006 | ............. H04B 10/18 |
| EP | 1 694 017 A1 | 8/2006 | ............. H04B 27/22 |
| WO | WO 2007/132503 A1 | 11/2007 | ............. H04B 10/04 |

OTHER PUBLICATIONS

Digital signal processor (DSP). (2001). In Hargrave's Communications Dictionary, Wiley. Retrieved from http://www.credoreference.com/entry/hargravecomms/digital_signal_processor_dsp.*

(Continued)

*Primary Examiner* — David Payne  
*Assistant Examiner* — Tanya Motsinger  
(74) *Attorney, Agent, or Firm* — John F. McCabe

(57) ABSTRACT

A digital version of both amplitude and phase of a received optical is developed by employing direct differential detection in conjunction with digital signal processing. The signal is split into three copies. An intensity profile is conventionally obtained using one of the copies. Phase information is obtained by supplying each remaining copy to a respective one of a pair of optical delay interferometers that have orthogonal phase offsets, followed by respective balanced intensity detectors. The output of each of the balanced intensity detectors, and the intensity profile, are each converted to respective digital representations. Signal processing is used to develop the phase information from the digital representations of the output of the balanced intensity detector outputs.

51 Claims, 2 Drawing Sheets

(56) References Cited

U.S. PATENT DOCUMENTS

| | | | |
|---|---|---|---|
| 2008/0025733 A1* | 1/2008 | Nazarathy et al. ............ | 398/209 |
| 2008/0075472 A1* | 3/2008 | Liu ............................. | 398/202 |
| 2009/0034967 A1* | 2/2009 | Tao et al. ...................... | 398/33 |
| 2009/0074428 A1* | 3/2009 | Liu .................... | H04B 10/2513 398/208 |
| 2009/0208224 A1* | 8/2009 | Kikuchi .............. | H04B 10/672 398/141 |
| 2010/0021179 A1* | 1/2010 | Kikuchi ................ | H04B 10/61 398/183 |
| 2010/0239267 A1* | 9/2010 | Kikuchi ............... | H04L 27/361 398/156 |
| 2011/0236033 A1* | 9/2011 | Kikuchi ................. | H04B 10/50 398/183 |
| 2011/0305457 A1* | 12/2011 | Kikuchi ............ | H04B 10/5055 398/65 |
| 2012/0281988 A1* | 11/2012 | Kikuchi ............ | H04B 10/5561 398/159 |
| 2013/0315607 A1* | 11/2013 | Sadot ................ | H04B 10/2507 398/159 |

OTHER PUBLICATIONS

Multilevel code. (2001). In Hargrave's Communications Dictionary, Wiley. Retrieved from http://www.credoreference.com/entry/hargravecomms/multilevel_code.*

Tsukamoto, et al "Unrepeated Transmission of 20-Gb/s Optical Quadrature Phase-Shift-Keying Signal Over 200-km Standard Single-Mode Fiber Based on Digital Processing of Homodyne-Detected Signal for Group-Velocity Dispersion Compensation" IEE Photonics Technology Letters, vol. 18, No. 9, May 1, 2006, pp. 1016-1018 cited in the application abstract; figure 4.

PCT International Search Report dated Jan. 17, 2008 (PCT/US2007/020367) 2 pages.

Diego E. Crivelli et al, Adaptive Digital Equalization in the Presence of Chromatic Dispersion, PMD, and Phase Noise in Coherent Fiber Optic Systems—IEEE Communications Society, Globecom 2004 pp. 2245-2551.

Agere Systems, Polarization Controller Overview—Jun. 2002—pp. 1 to 7.

T. Merker et al, PMD Compensation Up To Second Order by Tracking the Principle States of Polarization Using a Two-Section Compensator—Oct. 15, 2001—pp. 1 to 7.

Henrik Sunnerud et al, A Comparison Between Different PMD Compensation Techniques—Journal of Lightwave Technology, vol. 20 No. 3, Mar. 2002—pp. 1 to 11.

Fred Heismann. Analysis of a Reset-Free Polarization Controller for Fast Automatic Polarization Stabilization in Fiber-optic Transmission Systems—Journal of Lightwave Technology, vol. 12 No. 4, Apr. 1994—pp. 1 to 10.

Ezra Ip et al, Digital Equalization of Chromatic Dispersion and Polarization Mode Dispersion, Journal of Lightwave Technology, vol. 25, No. 8, Aug. 2007, pp. 1 to 11.

J.P. Gordon et al, Review—PMD Fundamental: Polarization Mode Dispersion In Optical Fibers, Feb. 2, 2000, pp. 1 to 10.

* cited by examiner

RECONSTRUCTION AND RESTORATION OF AN OPTICAL SIGNAL FIELD

TECHNICAL FIELD

This invention relates to the reconstruction and restoration of an optical signal field.

BACKGROUND OF THE INVENTION

Linear and nonlinear effects distort optical signals transmitted over optical fibers. Such effects include chromatic dispersion (CD) and self-phase modulation (SPM). Optical dispersion compensation is typically employed to reduce signal distortion that arises as a result of CD.

Electronic dispersion compensation (EDC) has recently emerged as a technique that can flexibly reduce the distortion induced by CD in a cost effective manner. As explained by M. S. O'Sullivan, K. Roberts, and C. Bontu, in "Electronic dispersion compensation techniques for optical communication systems," ECOC'05, paper Tu3.2.1, 2005, EDC can be performed at the transmitter. Doing so is referred to herein as pre-EDC. Alternatively, as described by S. Tsukamoto, K. Katoh, and K. Kikuchi, in "Unrepeated Transmission of 20-Gb/s Optical Quadrature Phase-Shift-Keying Signal Over 200-km Standard Single-Mode Fiber Based on Digital Processing of Homodyne-Detected Signal for Group-Velocity Dispersion Compensation," IEEE Photonics Technology Letters, Volume 18, Issue 9, 1 May 2006, pp. 1016-1018, EDC can be performed at the receiver, which is referred to herein as post-EDC.

Post-EDC has an advantage over pre-EDC, in that post-EDC does not require that performance feedback be supplied from the receiver to the transmitter. Unfortunately, direct intensity detection, also known as square-law detection, which is the commonly used optical detection technique of today's optical fiber communications systems, e.g., the optical to electronic conversion performed by photodiodes, only recovers the optical signal amplitude and cannot recover the optical signal phase information, thus making the performance of post-EDC much poorer than that of pre-EDC.

To overcome this shortcoming, and hence enhance the performance of the post-EDC, the Tsukamoto et al. article suggests employing coherent detection to fully reconstruct the optical signal's complex field, i.e., both amplitude and phase. However, disadvantageously, as compared to direct intensity detection, coherent detection is much more sophisticated, and hence more expensive and difficult to perform. Further disadvantageously, coherent detection requires the use of an optical local oscillator (OLO), as well as phase and polarization tracking between the OLO and the signal carrier.

SUMMARY OF THE INVENTION

In accordance with the principles of the invention, a digital version of the complex optical field, i.e., both amplitude and phase, e.g., with respect to a reference point, of a received optical is developed at a receiver by employing direct differential detection in conjunction with digital signal processing.

More specifically, as is well known, the complex optical field of any signal can be reconstructed by knowing its intensity and phase profiles. The intensity profile may be obtained by conventional direct intensity detection. As to obtaining the phase, in accordance with an aspect of the invention, first an electronic analog representation of a complex waveform that contains information about the phase differences between adjacent locations that are separated by a prescribed time difference $\Delta T$ in the received signal is obtained by employing a pair of optical delay interferometers that have orthogonal phase offsets, i.e., the difference between the phase offsets is $\pi/2$, followed by two balanced intensity detectors. The output of the first interferometer after the balanced intensity detection is the real part of the complex waveform, while the output of the second interferometer after the balanced intensity detection is the imaginary part of the complex waveform. The output of each of the balanced intensity detectors, and the intensity profile if obtained by direct intensity detection, are converted to a digital representation using analog to digital conversion. The sample period for the analog to digital conversion may be shorter than $\Delta T$, so that multiple samples may exist within a period of $\Delta T$. From the digital representation of the complex waveform, the phase difference between the adjacent locations that are separated by $\Delta T$ may be obtained. Then, based on the obtained phase differences, and optionally, a search for an initial phase offset among the multiple samples within a period of $\Delta T$, the phase relationship among all the samples is obtained. Essentially the absolute phase profile for the received signal is thus derived with the only uncertainty being that of a constant phase shift, which is insignificant.

To simplify the hardware necessary, optionally, the intensity profile may be approximated from the absolute value of the complex waveform rather than obtaining it by direct intensity detection. Furthermore, optionally, once the intensity profile and the phase profile of the optical signal as received are recovered, digital signal processing may be employed to compensate for the distortions in the received signal, e.g., signal distortions due to chromatic dispersion and SPM, so that an accurate representation of the originally transmitted optical signal waveform may be reconstructed electronically.

The techniques of the instant invention are suitable to be employed with various types of optical differential phase-shift keying (DPSK) signals, such as differential binary phase-shift keying (DBPSK) and differential quadrature phase-shift keying (DQPSK) signals. They may also be employed with amplitude-shift keying (ASK), combined DPSK/ASK, and quadrature amplitude modulation (QAM).

DETAILED DESCRIPTION

Figure 1:
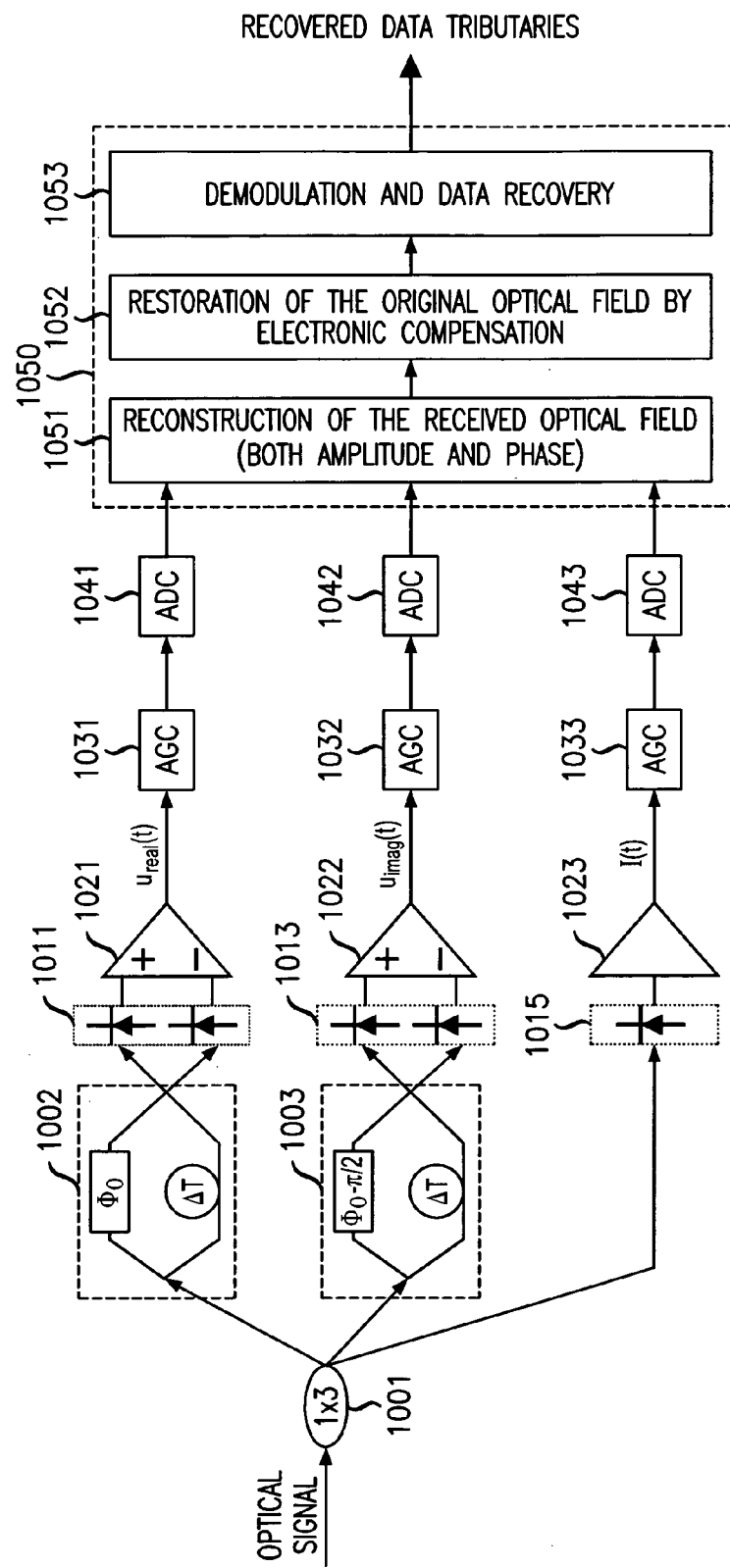
FIG. 1 shows an exemplary apparatus for reconstructing and restoring an optical signal field in accordance with the principles of the invention.

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

In the description, identically numbered components within different ones of the FIGs. refer to the same components.

FIG. 1 shows an exemplary apparatus, typically in a receiver, arranged in accordance with the principles of the invention, for developing the entire complex optical field of a received optical signal by employing direct differential detection in conjunction with digital signal processing and for compensating for various impairments that were inflicted upon the optical signal as it traveled from its source. FIG. 1 shows a) 1×3 optical splitter 1001; b) optical delay interferometers (ODIs) 1002 and 1003; c) balanced intensity detectors 1011 and 1013; d) photodiode 1015; e) amplifiers 1021, 1022, and 1023; f) optional automatic-gain controllers (AGCs) 1031, 1032, and 1033; g) analog-to-digital converters (ADCs) 1041, 1042, and 1043; and h) digital signal processing unit 1050.

More specifically, 1×3 optical splitter 1001 replicates the incoming optical signal so as to produce three copies. The optical power allotted to each of the copies from the originally input optical signal is at the discretion of the implementer. In one embodiment of the invention, the power is divided up so that about between 40 to 45 percent of the input power is supplied as output to each of ODIs 1002 and 1003 and the remaining power, e.g., between 10 and 20 percent, is supplied to photodiode 1015.

As will be readily recognized by those of ordinary skill in the art, optical delay interferometers (ODIs) 1002 and 1003 may be any type of interferometer having the required characteristics. For example, ODIs 1002 and 1003 may be based on the well-known, so-called Mach-Zehnder interferometer. Alternatively, ODIs 1002 and 1003 may be based on the well-known, so-called Michaelson interferometer.

ODI 1002 has a delay of about ΔT in the optical path between its respective two arms and a phase difference, i.e., offset, of $\phi_0$, where $$\Delta T = \frac{T_S \cdot m}{sps}, \quad (1)$$

$1 \le m \le sps$, and $m$ is an integer, and where $T_S$ is the symbol period of the signal, sps is the number of samples per symbol taken by analog to digital converters 1041, 1042, and 1043, m is an integer between 1 and sps, and is an arbitrarily selected number. If so, the free spectral range (FSR), i.e., 1/ΔT, of ODIs 1002 and 1003 is related to the signal symbol rate (SR)

$$FSR = \frac{SR \cdot sps}{m}.$$

Note mat, based on numeric simulations, it has been found that, preferably, sps be set to a value of 4, and m can be a value of 1, 2, 3, or 4. This is because an sps value of less than 4 tends to not be sufficient to accurately represent the signal waveform sufficiently given the procedures described hereinbelow, while sps greater than 4 provides only negligible improvement.

The delay difference may be achieved, in one embodiment of the invention, by adjusting one arm of the interferometer to have a gross length difference of ΔT*C/n, where C is the speed of light in vacuum and n is the index of refraction of the medium of the arm, and then adjusting the length further to cause a phase shift of $\phi_0$. Note that in practice, because a phase shift of $\phi_0$ corresponds to a very small length difference, the phase shift portion may actually be somewhat longer or shorter, so that the total length is $\phi_0$ plus or minus a multiple of 2π. That way, even thought the length is not precisely $\phi_0$, the phase change is effectively $\phi_0$.

The total length change used to achieve the effective length change of $\phi_0$ may be some percentage of the length $\Delta T \cdot C/n$. While even up to 25 percent can work, preferably, the percentage is less than 10 percent, and of course, the more accurate the length can be made to match the actual desired length the better the performance will be. In other embodiments of the invention, the delay required may be divided between the arms, so long as the required delay and phase difference is achieved. Those of ordinary skill in the art will readily recognize how to develop an appropriate arrangement to implement ODI 1002.

While any value may be employed as the value of phase offset $\phi_0$, for compatibility with conventional receivers, as will be seen hereinbelow, certain values of $\phi_0$ may be advantageously employed. For example, a good value of $\phi_0$ is $\pi/4$ for DQPSK and 0 for DBPSK.

ODI 1003 is similar to ODI 1002, in that it has delay of about $\Delta T$ in the optical path between its respective two arms, but between its arms it has a phase offset of $\phi_0 - \pi/2$. Thus, the difference between the phase offsets of ODIs 1002 and 1003 is $\pi/2$, so ODI 1002 and 1003 are said to have orthogonal phase offsets.

Balanced intensity detectors 1011 and 1013 are conventional. Typically, each of balanced intensity detectors 1011 and 1013 is made up of a pair of well-matched photodiodes. Balanced intensity detectors 1011 and 1013 convert the output of each of the arms of ODIs 1002 and 1003 to an electrical representation. Thus, balanced intensity detectors 1011 and 1013 obtain an electrical version of the real and imaginary parts of the complex waveform that contains the information about the phase differences between two time locations separated by $\Delta T$ in the received optical signal.

Photodiode 1015 performs conventional direct intensity detection, and thus obtains the intensity profile of the received optical signal in electronic form.

Amplifiers 1021, 1022, and 1023 amplify the signals supplied as outputs by balanced intensity detector 1011, balanced intensity detector 1013, and photodiode 1015, respectively. Typically, amplifiers 1021, 1022, and 1023 convert the current which is output by the various photodiodes of balanced intensity detector 1011, balanced intensity detector 1013, and photodiode 1015 to respective corresponding voltages. To this end, amplifiers 1021, 1022, and 1023 may be transimpedance amplifiers. Furthermore, amplifiers 1021 and 1022 may be differential amplifiers. After amplification, each of the outputs is typically single ended. Optional automatic-gain controllers (AGCs) 1031, 1032, and 1033 may be employed to normalize the electronic waveforms prior to digitization.

Analog-to-digital converters (ADCs) 1041, 1042, and 1043 perform "digital sampling" of the amplified signals to develop a digital representation of the amplified signals. ADCs 1041, 1042, and 1043 typically have the same resolution, e.g., 8 bits.

Digital signal processing unit 1050 receives the digital representation of the amplified signals and develops a digital representation of the amplitude and phase profiles of the received optical signal, in accordance with an aspect of the invention. In particular, reconstruction unit 1051 performs such development. Furthermore, in accordance with another aspect of the invention, digital signal processing unit 1050 may develop a digital representation of the original waveform of the optical signal as it was transmitted prior to undergoing impairments in the channel over which it passed by digitally compensating for various ones of the transmission impairments experienced by the optical signal, e.g., chromatic dispersion and/or self-phase modulation. Restoration unit 1052 performs such restoration. Lastly, demodulation and data recovery unit 1053 performs demodulation and conversion to actual bits.

An exemplary process for recovering the entire complex optical signal field by coupling direct differential detection with digital signal processing in accordance with the principles of the invention, using the arrangement of FIG. 1, is as follows. First, the intensity profile of the received optical field is obtained by direct intensity detection using photodiode 1015. The intensity profile, represented by I(t), is computed as $$I(t) = y(t)y(t)^* \tag{2}$$

where y(t) is the received complex optical field as it arrives at coupler 1001 and * denotes complex conjugate.

The outputs of balanced detectors 1011 and 1013 are analog representations of, respectively, the real, $u_{real}(t)$, and imaginary, $u_{imag}(t)$, parts of the following complex waveform that contains information about the phase differences between two time locations separated by $\Delta T$ $$\begin{aligned} u(t) &= u_{real}(t) + j \cdot u_{imag}(t) \\ &= y(t) \cdot y(t - \Delta T)^* \cdot \exp[j\phi_0] \\ &= |y(t)y(t-\Delta T)|\exp\{j[\phi(t) - \phi(t - \Delta T) + \phi_0]\}, \end{aligned} \tag{3}$$

using the following definitions:

$$y(t) = |y(t)|\exp[j\phi(t)],$$

$$y(t-\Delta T) = |y(t-\Delta T)|\exp[j\phi(t-\Delta T)]. \tag{4}$$

After the analog representations of the real and imaginary parts of the complex waveform u(t) are amplified, they are converted into digital representations by sampling, e.g, by ADCs 1041 and 1042. Likewise, after the intensity profile is amplified, it too is converted to a digital representation by sampling, e.g, by ADC 1043. ADCs 1041 and 1042 may be consider an ADC unit, which may also include ADC 1043. Sampling of the complex waveform and the intensity profile is performed at the following time locations ($t_s$):

$$t_1, t_1 + \frac{1}{sps}T_S, t_1 + \frac{2}{sps}T_S, \ldots, t_1 + \frac{sps-1}{sps}T_S, \tag{1st-bit}$$

$$t_1 + T_S, t_1 + T_S + \frac{1}{sps}T_S, t_1 + T_S + \frac{2}{sps}T_S, \ldots, t_1 + T_S + \frac{sps-1}{sps}T_S, \tag{2nd-bit}$$

$$\ldots$$

$$t_1 + nT_S, t_1 + nT_S + \frac{1}{sps}T_S, t_1 + nT_S + \frac{2}{sps}T_S, \ldots, t_1 + nT_S + \frac{sps-1}{spsp}T_S, \tag{nth-bit}$$

where $t_1$ is an initial, arbitrary, time position and n is an arbitrarily selected number for use in showing how the equation is generalized to any bit position.

For example, for sps=4, the sampling time locations are as follows:

$$t_1, t_1 + \frac{1}{4}T_S, t_1 + \frac{1}{2}T_S, t_1 + \frac{3}{4}T_S, \quad \text{(1st-bit)}$$

$$t_1 + T_S, t_1 + T_S + \frac{1}{4}T_S, t_1 + T_S + \frac{1}{2}T_S, t_1 + T_S + \frac{3}{4}T_S, \quad \text{(2nd-bit)}$$

$$\ldots$$

$$t_1 + nT_S, t_1 + nT_S + \frac{1}{4}T_S, t_1 + nT_S + \frac{1}{2}T_S, t_1 + nT_S + \frac{3}{4}T_S, \quad \text{(nth-bit)}$$

After the digital representations of the real and imaginary parts of the complex waveform, $u_{real}(t_S)$, and $u_{imag}(t_S)$, are obtained, they are supplied to digital signal processing unit 1050. Likewise, after the digital representation of the intensity waveform, $I(t_S)$, is obtained, it too is supplied to digital signal processing unit 1050.

The digital samples are first used to reconstruct the amplitude and phase profiles of the received optical signal by reconstruction unit 1051. This reconstruction step may include the following procedures.

First, a group of samples from each sampled waveform $I(t_S)$, $u_{real}(t_S)$, and $u_{imag}(t_S)$, are selected as a "frame" to be processed together. The size of the frame, i.e., the number of symbols for which samples are taken, is chosen to be larger than the maximum number of optical symbols that interact during optical transmission as result of chromatic dispersion or other effects during optical transmission. Note that by interacting it is meant that the pulses that make up the symbols overlap each other due to the broadening of the pulses caused by the dispersion property of the fiber. For example, for a 20-Gb/s DQPSK signal experiencing a chromatic dispersion of 17,000 ps/nm, which corresponds to the same dispersion that would be produced by 1,000 km standard single-mode fiber (SSMF), the maximum number of interacting optical symbols is about 30. For such an exemplary situation, a suitable frame size may be 64 symbols, or 64·sps samples.

Secondly, the filtering effect due to the bandwidth limitations of photo-detectors 1011, 1013, and 1015 and ADCs 1041 1042, and 1043 may need to be compensated for by inversely filtering the digital waveforms. In other words, the inverse of the filter transfer function caused by the superposition of the photo-detector response and the ADC response is digitally applied to the digital waveform.

Thirdly, the phase factor that represents the optical phase differences between samples that are separated by ΔT in time, $\Delta\phi(t_s)=\phi(t_s)-\phi(t_s-\Delta T)$, as given by equation 3, may be obtained as follows $$\exp[j\Delta\phi(t_s)] = \exp\{j[\phi(t_s) - \phi(t_s - \Delta T)]\} \quad (5)$$

$$= \frac{u(t_s) \cdot \exp(-j\phi_0)}{|u(t_s)|}.$$

Notice that although one still needs to know the value of $\phi_0$, the computation of equation 5 effectively removes the impact of $\phi_0$ in obtaining the phase factor, so that $\phi_0$ can be of any arbitrary value. The finding of the value of $\phi_0$ could be achieved by a real world search, e.g., an automated search, which varies the value of $\phi_0$ until an optimum guess is found. The guess that yields the least bit error rate is selected as the optimum guess. Alternatively, the guess that provides the best optical signal spectrum of the signal as reconstructed as described hereinbelow can be selected as the optimum guess. Another possibility is that instead of performing a search, all the results using different values of $\phi_0$ over the range from 0 to $2\pi$ can be computed and the value of $\phi_0$ that gives the best result is selected as the optimum guess. Doing so allows moving directly, and hence possibly more quickly, to the value of $\phi_0$. For example, the computation could be performed for 40 possible candidate values of $\phi_0$ with a spacing between each candidate value of $0.05\pi$.

Fourthly, in theory, the signal phase profile of each respective "subgroup" of samples within a frame, each subgroup consisting of those samples of the frame that have a spacing between them of ΔT or a whole number multiple thereof, may be obtained, based on the optical phase differences of adjacent samples within the subgroup, by determining $$\phi(t_1 + n \cdot \Delta T) = \phi(t_1) + \sum_{p=1}^{n} \Delta\phi(t_1 + p \cdot \Delta T), \quad \text{(subgroup 1)} \quad (6)$$

$$\phi\left(t_1 + n \cdot \Delta T + \frac{1}{sps}T_S\right) = \phi\left(t_1 + \frac{1}{sps}T_S\right) + \sum_{p=1}^{n} \Delta\phi\left(t_1 + \frac{1}{sps}T_S + p \cdot \Delta T\right), \quad \text{(subgroup 2)}$$

$$\ldots,$$

$$\phi\left(t_1 + n \cdot \Delta T + \frac{m-1}{sps}T_S\right) = \phi\left(t_1 + \frac{m-1}{sps}T_S\right) + \sum_{p=1}^{n} \Delta\phi\left(t_1 + \frac{m-1}{sps}T_S + p \cdot \Delta T\right) \quad \text{(subgroup } m\text{)}$$

where n is the position of a particular sample within the subgroup and when n=0 the summation is not computed at all.

Practically, rather than obtaining the phase directly, it is sufficient to obtain merely the phase factors, as follows.

$$e^{j\phi(t_1+n\cdot\Delta T)} = e^{\phi(t_1)} \cdot \prod_{p=1}^{n} e^{j\Delta\phi(t_1+p\cdot\Delta T)}, \quad \text{(subgroup 1)} \quad (7)$$

$$e^{j\phi\left(t_1+n\cdot\Delta T+\frac{1}{sps}T_S\right)} = e^{\phi\left(t_1+\frac{1}{sps}T_S\right)} \cdot \prod_{p=1}^{n} e^{j\Delta\phi\left(t_1+p\cdot\Delta T+\frac{1}{sps}T_S\right)}, \quad \text{(subgroup 2)}$$

$$\ldots$$

$$e^{j\phi\left(t_1+n\cdot\Delta T+\frac{m-1}{sps}T_S\right)} = e^{\phi\left(t_1+\frac{m-1}{sps}T_S\right)} \cdot \prod_{p=1}^{n} e^{j\Delta\phi\left(t_1+p\cdot\Delta T+\frac{m-1}{sps}T_S\right)} \quad \text{(subgroup } m\text{)}$$

where n is the position of a particular sample within the subgroup and when n=0 the multiplication is not computed at all. The phase factors give the phase correlation among the samples within each subgroup. However, the phase relationship among the subgroups is not yet known. Thus, it is necessary to determine m−1 phase differences. Once the phase relationship among the like-spaced samples of the subgroups, e.g., the first samples, i.e., the samples for which n=0, is known, then the phase relationship among all of the samples will be completely specified. For example, for n=0, the differences between each adjacent pairing of the terms before the summation symbol in equation 6, for example $$\phi\left(t_1 + \frac{1}{sps}T_S\right) - \phi(t_1),$$

should be determined.

The phase relationship among the like-spaced samples of these subgroups may be estimated as follows. An initial phase difference which can be any value between 0 and $2\pi$ is selected as a candidate phase difference for candidate pairing of any two of these samples out of all possible phase offsets to obtain a "trial phase relationship" among all the samples in the frame. The initial phase difference may be between 0 and $2\pi$, as this is the range of the actual phase difference. It has been found that a good initial candidate phase difference is $0.1\pi$. Furthermore, since various candidate phase offsets will be tried in order to determine the best one using a searching process, it is necessary to select a resolution for which the candidate phase offsets will be selected. A good value for the resolution has been found to be $0.1\pi$. Thereafter, the optical signal field is reconstructed to produce a trial reconstructed optical signal based on the selected phase difference and the known intensity profile $I(t_S)$. This may be achieved by determining $$E_r(t_s) = \sqrt{I(t_s)} \cdot e^{j\phi(t_s)} \quad (8)$$

where $E_r(t_s)$ is the reconstructed signal for the current set of values that is the current estimate of the received optical signal.

The optical power spectrum of the trial reconstructed signal is then obtained by performing a Fourier transformation on the trial reconstructed signal. The power for that portion of the trial reconstructed signal that falls within the frequency range of [−SR, +SR] about the signal center frequency is obtained. This process is repeated by selecting a new candidate phase offset, e.g., by increasing the previous candidate phase. The set of "trial" phase offsets among the like-spaced samples of these subgroups that gives the maximal spectral power within [−SR, +SR] about the signal center frequency is selected as the best estimate. The phase relationship among all samples in the frame can then be determined based on the best estimate.

Alternatively, the set of trial phase offsets among the like-spaced samples of these subgroups that gives the minimal spectral power outside [−SR, +SR] about the signal center frequency is selected as the best estimate. The phase relationship among all samples in the frame can then be determined based on the best estimate.

In one embodiment of the invention, it may be desirable to set $\Delta T = T_s/sps$. As a result, the delay $\Delta T$ is equal to the sampling resolution, m=1, and hence there is only one subgroup in a frame, so all of the samples have a phase relationship with their immediately adjacent samples. In such an embodiment of the invention, the phases of all the samples in a frame can be obtained straightforwardly, in theory, by determining $$\phi(t_s = t + n \cdot \Delta T) = \phi(t_1) + \Delta\phi(t1 + \Delta T) + \Delta\phi(t1 + 2 \cdot \Delta T) \ldots + \Delta\phi \quad (9)$$
$$(t_s),$$

which is a special case of equation 6, i.e., only the first subgroup, which is the only subgroup, is computed.

Practically, rather than obtaining the phases directly, it is sufficient to obtain merely the phase factors for each of the samples, as follows:

$$e^{j\phi(t_s = t_1 + n \cdot \Delta T)} = e^{j\phi(t_1)} \cdot \prod_{p=1}^{n} e^{j\Delta\phi(t_1 + p \cdot \Delta T)}, \quad (10)$$

which is a special case of equation 7, i.e., only the first subgroup, which is the only subgroup, is computed.

Finally, the digital representation of the received optical signal field, $E_R(t_s)$, can be obtained based on the obtained phase factor and the intensity profile $I(t_s)$ by $$E_R(t_S) = \sqrt{I(t_s)} \cdot e^{j\phi(t_s)} \quad (11)$$

Figure 2:
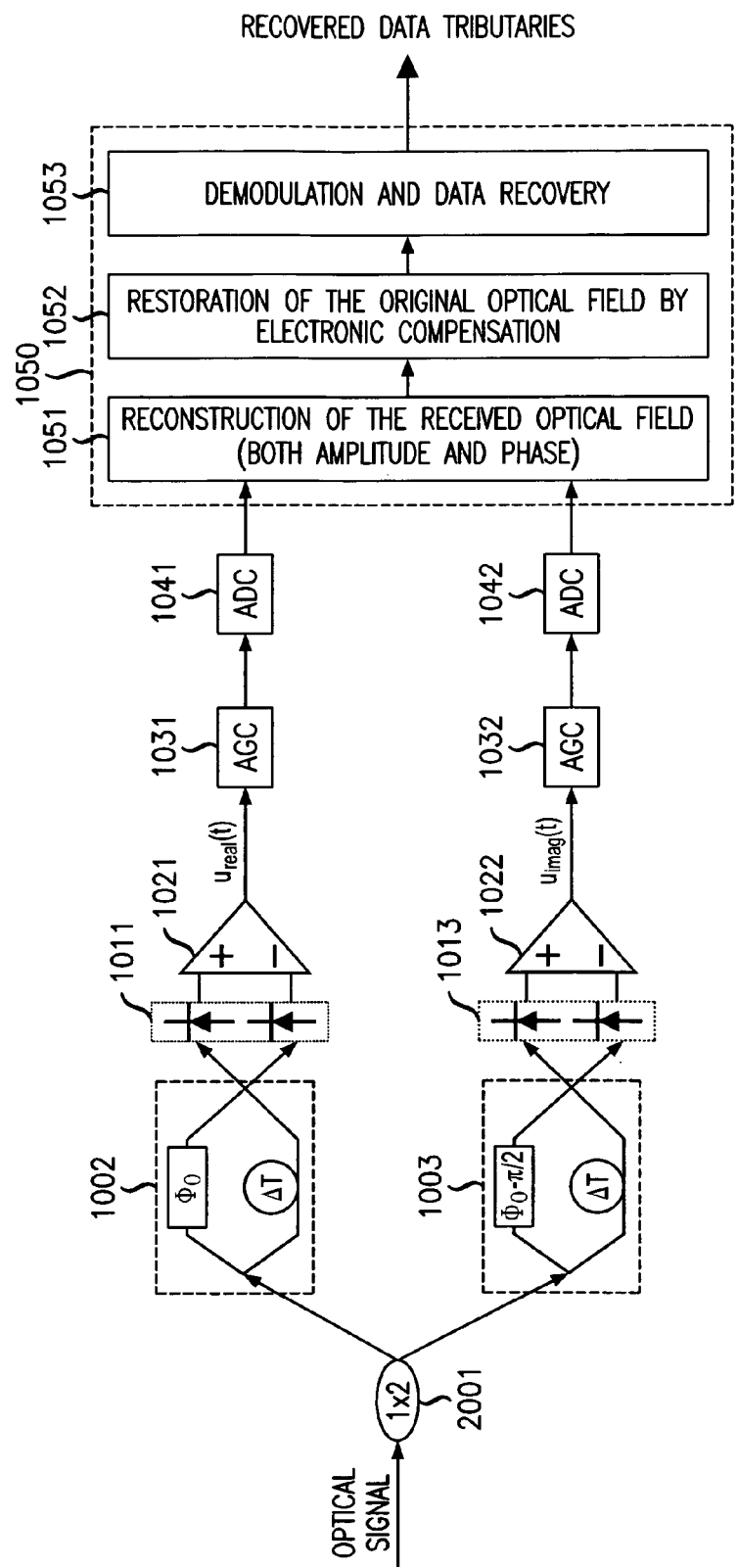
FIG. 2 shows an embodiment of the invention similar to that shown in FIG. 1 but in which the intensity profile is approximated rather than directly recovered from the received optical signal.

In one embodiment of the invention, shown in FIG. 2, when $\Delta T$ is sufficiently small as compared to the symbol period $T_s$, the intensity profile may be approximated by $|u(t_s)|$, and so $$E_R(t_s) \approx \sqrt{|u(t_s)|} e^{j\phi(t_s)} \quad (12)$$

or preferably $$E_R(t_s) \approx \left[|u(t_s)| \cdot \left|u\left(t_s + \frac{T_S}{sps}\right)\right|\right]^{1/4} e^{j\phi(t_s)}. \quad (13)$$

Note that $\Delta T$ may be considered to be sufficiently small when it is a least a factor of 2 smaller than the symbol period, i.e., $\Delta T \leq T_S/2$. For sps=4, preferably, $\Delta T = T_S/4$.

Using this approximation means that photodiode 1015, amplifier 1023, optional automatic-gain controller 1033, and analog-to-digital converter 1043, are not required, and hence they are not shown in FIG. 2. Also, 1×3 optical splitter 1001 is replaced by simpler 1×2 optical splitter 2001, since there is no need for a branch to determine the intensity, and hence only two copies are required.

After the received optical signal field is developed in the digital domain by reconstruction unit 1051, the digital representation of the optical signal field as originally launched from a transmitter, $E_T(t_s)$, can then be derived by restoration unit 1052. To this end, restoration unit 1052 electronically compensates for various distortions, such as distortion caused by chromatic dispersion and, in accordance with an aspect of the invention, a) self-phase modulation (SPM) and b) combinations of chromatic dispersion and SPM that the transmitted signal suffered as it traveled to the receiver.

When the signal is primarily distorted by chromatic dispersion, restoration unit 1052 may restore the original optical signal field by determining $$E_T(t_s) = \overline{F}\{F[E_R(t_s)] \cdot e^{-j \cdot f(D_{total})}\}, \quad (13)$$

where F(x) and F(y) are, respectively, the Fourier and inverse-Fourier transformations of signals x and y, $f(D_{total})$ represents the frequency-dependent modification of the optical phase of the signal due to the dispersive effect resulting from a dispersion with value D, and the "−" sign indicates the removal of the dispersive effect. More simply, this may be approximated using conventional techniques employing finite impulse response (FIR) filters.

When the signal is distorted essentially only by SPM, such SPM may be compensated for by an embodiment of the invention in which restoration unit 1052 determines $$E_T(t_s) = \overline{F}\{F[E_R(t_s)] \cdot e^{j \cdot \Delta\Phi_{NL}}\}, \quad (14)$$

where F(x) and F(y) are, respectively, the Fourier and inverse-Fourier transformations of signals x and y, as before, $\Delta\Phi_{NL}$ represents the total nonlinear phase due to the SPM, and the minus sign indicates the removal of the dispersive effect.

When, the signal is distorted by both chromatic dispersion and SPM such combined chromatic dispersion and SPM may be compensated for by an embodiment of the invention in which restoration unit 1052 treats the fiber link connecting the transmitter and the receiver as being made up of N segments, each having the same dispersion and SPM effects, where the segment that is closest to the transmitter is considered to be the first segment and the segment that is closest to the receiver is considered to be the $N^{th}$ segment. Restoration unit 1052 then obtains the digital representation of the original optical field by performing the iterative process embodied by the following pseudocode:

```
E(t_s, N+1) = E_R(t_s),
for n = N to 1
    E_D(t_s) = F̄{F[E(t_s,n+1)]·e^{-j·f(D_total/N)}},
    E(t_s,n) = E_D(t_s)·e^{-jΔΦ_NL·|E_D(t_s)|^2/N},
end
E_T(t_s) = E(t_s,1)
``` where $E(t_s, N)$ is the restored optical field at the beginning of the N-th segment, $\Delta\Phi_{NL}$ represents the total nonlinear phase due to the SPM.

After the original optical field is restored in the digital domain, it is further processed by demodulation and data recovery unit 1053. For example, when the optical signal is modulated by DQPSK format, the conventional optical DQPSK demodulation process obtains the decision variables for the in-phase (I) and quadrature (Q) data tributaries by determining $$u_I(t_s) = \text{real}\left[E_T(t_s) \cdot E_T(t_s - T_s)^* \cdot \exp(j\frac{\pi}{4})\right], \quad (15)$$

$$u_Q(t_s) = \text{imag}\left[E_T(t_s) \cdot E_T(t_s - T_s)^* \cdot \exp(j\frac{\pi}{4})\right].$$

Once the decision variables are obtained, a decision can be made to recover the original data I- and Q-tributaries transmitted at the transmitter through $$C_I(t_d) = \begin{cases} 1, & u_I(t_d) \geq V_{th}, \\ 0, & u_I(t_d) < V_{th} \end{cases} \quad (16)$$

$$C_Q(t_d) = \begin{cases} 1, & u_Q(t_d) \geq V_{th}, \\ 0, & u_Q(t_d) < V_{th} \end{cases}$$

where $t_d$ is the decision time and $V_{th}$ is the decision threshold, which is usually about zero.

As will be readily understood by those of ordinary skill in the art, optional receiver performance monitoring can be used to provide information on how well the reconstruction and restoration processes are succeeding in recovering the original optical signal. Moreover, a feedback control may be applied to optimize each step in the reconstruction and restoration processes. For example, in the case where $\phi_0$ is slowly changing with time, e.g., due to the drift of the frequency of the optical signal carrier at the transmitter or temperature-induced path length changes in the ODIs, equation (5) can be dynamically adjusted, with a feedback control, to always find a best guess for the time-varying $\phi_0$ so as to thereby accurately obtain the phase factor.

As will be readily understood by those of ordinary skill in the art, the instant invention may be applied to optical differential phase-shift keying (DPSK) signals, such as differential binary phase-shift keying (DBPSK) and differential quadrature phase-shift keying (DQPSK) signals, since ODI(s) and balanced detection are commonly used for DPSK detection. Furthermore, this invention may also be applied to amplitude-shift keying (ASK), combined DPSK/ASK, and differential QAM.

What is claimed is:

1. An optical receiver, comprising:
   a direction differential detection receiver, said direct differential detection receiver being configured to receive an incoming optical signal as an input and to supply as an output analog representations of real and imaginary part of a complex waveform that contains information about phase difference between a plurality of time locations in said incoming optical signal that are spaced by a prescribed amount; and
   a signal processor, coupled to said direction differential detection receiver, the signal processor being configured to develop (i) a digital representation of an intensity and (ii) a digital representation of a phase profile and to use the both of said profiles together to reconstruct a digital version of the complex optical field of said incoming optical signal.

2. The invention as defined in claim 1 wherein said signal processor further comprises means for compensating said digital representation of an intensity and a phase profile representing said incoming optical signal for at least one transmission impairment inflicted on said received optical signal by a channel over which said received optical field had traveled.

3. The invention as defined in claim 1 wherein said signal processor further comprises means, responsive to said digital representation of an intensity and a phase profile representing said incoming optical signal, for performing demodulation and data recovery.

4. The invention as defined in claim 1 wherein said signal processor determines a phase value that represents optical phase differences between samples of said complex waveform that are separated by said prescribed amount.

5. The invention as defined in claim 1 wherein said signal processor obtains samples of said complex waveform at time locations for each bit, which are defined as $$t_1, t_1 + \frac{1}{sps}T_S, t_1 + \frac{2}{sps}T_S, \ldots, t_1 + \frac{sps-1}{sps}T_S, \quad \text{(1st-bit)}$$

$$t_1 + T_S, t_1 + T_S + \frac{1}{sps}T_S, t_1 + T_S + \frac{2}{sps}T_S, \ldots, t_1 + T_S + \frac{sps-1}{sps}T_S, \quad \text{(2nd-bit)}$$

$$\ldots$$

$$t_1 + nT_S, t_1 + nT_S + \frac{1}{sps}T_S, t_1 + nT_S + \frac{2}{sps}T_S, \ldots, t_1 + nT_S + \frac{sps-1}{sps}T_S, \quad \text{(nth-bit)}$$

where $t_1$ is an initial, arbitrary, time position and n is an arbitrarily selected number.

6. The invention as defined in claim 1 wherein said direct differential detection receiver further comprises a direct intensity detection unit to obtain an intensity profile of said incoming optical signal.

7. The invention as defined in claim 6 wherein said direct intensity detection unit is a photodiode.

8. The invention as defined in claim 1 further comprising an analog to digital converter unit, said analog to digital converter unit converting said real and imaginary parts of said complex waveform to respective digital representations thereof and supplying said digital representation of real and imaginary parts of said complex waveform to said signal processor.

9. The invention as defined in claim 8 wherein said direction differential detection receiver further comprises at least one photo-detector, and wherein said signal processor performs an inverse of the superposed filter transfer function caused by the inherent response of said at least one photo-detector and the inherent response of said analog to digital converter unit for at least one of said digital representation of said real and imaginary parts of said complex waveform.

10. The invention as defined in claim 8 further comprising an automatic gain control unit interposed between said direct differential detection receiver and said analog to digital converter.

11. The invention as defined in claim 8 wherein said analog to digital converter unit includes a plurality of analog to digital converters.

12. The invention as defined in claim 8 wherein said signal processor processes a group of samples of said digital representation of said real and imaginary parts of said complex waveform supplied by said analog to digital converter unit together.

13. The invention as defined in claim 12 wherein the size of said group is proportional to the maximum number of interacting optical symbols during optical transmission due to dispersive effects in an optical channel over which said incoming optical signal traveled.

14. The invention as defined in claim 1 wherein said direct differential detection receiver further comprises a plurality of optical delay interferometers.

15. The invention as defined in claim 14 wherein at least one of said plurality of optical delay interferometers has a delay equal to about said prescribed amount.

16. The invention as defined in claim 14 wherein at least two of said optical delay interferometers have orthogonal phase offsets.

17. The invention as defined in claim 14 wherein at least two of each of said plurality of optical delay interferometers have operating delays that are not equal to each other and each of said delays are about said prescribed amount.

18. The invention as defined in claim 14 wherein two of said plurality of optical delay interferometers have (i) operating delays that are not equal to each other and (ii) a delay difference between them that corresponds to an optical phase difference of $\pi/2$.

19. The invention as defined in claim 14 wherein said direct differential detection receiver further comprises at least two balanced intensity detectors, each of said balanced intensity detectors being coupled to a respective one of said optical delay interferometers.

20. The invention as defined in claim 14 further comprising an analog to digital converter, said analog to digital converter converting at least one of said real and imaginary parts of said complex waveform to a digital representation and supplying said digital representation of real and imaginary parts of said complex waveform to said signal processor, wherein said prescribed amount is $$\Delta T = \frac{T_S \cdot m}{sps}, \quad 1 \le m \le sps, \text{ and } m \text{ is an interger,}$$

where $T_S$ is the symbol period of said incoming optical signal, sps is a number of samples per symbol used by said analog to digital converter to convert said at least one of said real and imaginary parts of said complex waveform to a digital representation, m is an integer between 1 and sps, and wherein said complex waveform is $$u(t) = u_{real}(t) + j \cdot u_{imag}(t),$$

where $u_{real}(t)$ and $u_{imag}(t)$ are, respectively, said real and imaginary parts of said complex waveform.

21. The invention as defined in claim 20 wherein said signal processor determines a signal phase profile of each respective subgroup of samples within a frame, each subgroup comprising those samples of said frame that have a spacing between them of $\Delta T$ or a whole number multiple thereof, said signal phase profile being based on optical phase differences between adjacent samples within each subgroup, and being obtained by determining $$\phi(t_1 + n \cdot \Delta T) = \phi(t_1) + \sum_{p=1}^{n} \Delta\phi(t_1 + p \cdot \Delta T),$$

$$\phi\left(t_1 + n \cdot \Delta T + \frac{1}{sps}T_S\right) = \phi\left(t_1 + \frac{1}{sps}T_S\right) + \sum_{p=1}^{n} \Delta\phi\left(t_1 + \frac{1}{sps}T_S + p \cdot \Delta T\right),$$

..., $$\phi\left(t_1 + n \cdot \Delta T + \frac{m-1}{sps}T_S\right) = \phi\left(t_1 + \frac{m-1}{sps}T_S\right) + \sum_{p=1}^{n} \Delta\phi\left(t_1 + \frac{m-1}{sps}T_S + p \cdot \Delta T\right)$$

where n is the position of a particular sample within the subgroup and when n=0 the summation is not computed at all.

22. The invention as defined in claim 21 wherein $t_s$ is a time location and wherein said signal processor computes said digital representation of said received optical signal field, $E_R(t_s)$, by determining $E_R(t_s) = \sqrt{I(t_s)}e^{j\phi(t_s)}$, where $I(t_s)$ is an intensity profile of said incoming optical signal at time $t_s$ and $\phi(t_s)$ is a phase at time $t_s$.

23. The invention as defined in claim 21 further comprising a direct intensity detection unit coupled to an analog to digital converter for supplying said intensity profile.

24. The invention as defined in claim 21 wherein at time $t_s$ said intensity profile is approximated by the absolute value of $u(t_s)$.

25. The invention as defined in claim 21 wherein said signal processor determines a phase relationship between like-spaced samples in each respective one of m subgroups, wherein each subgroup comprises those samples of said frame that have a spacing between them of $\Delta T$ or a whole number multiple thereof.

26. The invention as defined in claim 21 wherein said signal processor determines a phase relationship among like-spaced samples of m subgroups, wherein each subgroup comprises those samples of said frame that have a spacing between them of $\Delta T$ or a whole number multiple thereof.

27. The invention as defined in claim 26 wherein said signal processor determines said phase relationship among said samples of only a first subgroup, which is the only subgroup.

28. The invention as defined in claim 26 wherein said signal processor determines a phase relationship among like-spaced samples of all of said m subgroups based on an analysis of an optical power spectra of a set of trial reconstructed signals based on said subgroups whereby all phase relationships of said samples of said incoming optical signal are determined.

29. The invention as defined in claim 28 wherein said analysis of said optical power spectra of a set of trial reconstructed signals determines a trial reconstructed signal whose optical spectral power within the frequency range of [−SR, +SR] about the center frequency of said incoming optical signal is highest among said set of trial reconstructed signals, wherein SR is the symbol rate of said incoming optical signal.

30. The invention as defined in claim 28 wherein said analysis of said optical power spectra of a set of trial reconstructed signals determines a trial reconstructed signal whose optical spectral power outside the frequency range of [−SR, +SR] about the center frequency of said incoming optical signal is lowest among said set of trial reconstructed signals, wherein SR is the symbol rate of said incoming optical signal.

31. The invention as defined in claim 20 wherein said signal processor determines a profile of a signal phase factor for each respective subgroup of samples within a frame, each subgroup comprising those samples of said frame that have a spacing between them of $\Delta T$ or a whole number multiple thereof, said signal phase factor being based on optical phase differences between adjacent samples within each subgroup, and being obtained by determining $$e^{j\phi(t_1+n\cdot\Delta T)} = e^{\phi(t_1)} \cdot \prod_{p=1}^{n} e^{j\Delta\phi(t_1+p\cdot\Delta T)},$$

$$e^{j\phi(t_1+n\cdot\Delta T+\frac{1}{sps}T_S)} = e^{\phi(t_1+\frac{1}{sps}T_S)} \cdot \prod_{p=1}^{n} e^{j\Delta\phi(t_1+p\cdot\Delta T+\frac{1}{sps}T_S)},$$

...

$$e^{j\phi(t_1+n\cdot\Delta T+\frac{m-1}{sps}T_S)} = e^{\phi(t_1+\frac{m-1}{sps}T_S)} \cdot \prod_{p=1}^{n} e^{j\Delta\phi(t_1+p\cdot\Delta T+\frac{m-1}{sps}T_S)}$$

where n is the position of a particular sample within the subgroup and when n=0 the multiplication is not computed at all.

32. The invention as defined in claim 31 wherein said signal processor computes said digital representation of said received optical signal field as a function of said profile of said signal phase factor and a digital representation of an intensity profile of said incoming optical signal.

33. The invention as defined in claim 31 wherein $t_s$ is a time location and wherein said signal processor computes said digital representation of said received optical signal field, $E_R(t_s)$, by determining $E_R(t_s)=\sqrt{I(t_s)}\cdot e^{j\Phi(t_s)}$, where $I(t_s)$ is an intensity profile of said incoming optical signal at time $t_s$ and $e^{j\Phi(t_s)}$ is a phase factor at time $t_s$.

34. The invention as defined in claim 33 further comprising a direct intensity detection unit coupled to an analog to digital converter for supplying said intensity profile.

35. The invention as defined in claim 33 wherein at time $t_s$ said intensity profile is approximated by the absolute value of $u(t_s)$.

36. The invention as defined in claim 33 wherein at time $t_s$ said intensity profile is approximated by the square root of the absolute value of $$u(t_s) \, u\!\left(t_s + \frac{T_S}{sps}\right).$$

37. The invention as defined in claim 33 wherein said signal processor further performs compensation on said digital representation of said received optical signal field for at least one transmission impairment inflicted by a channel over which said received optical field had traveled.

38. The invention as defined in claim 37 wherein said signal processor further performs demodulation and data recovery.

39. The invention as defined in claim 37 wherein said at least one transmission impairment belongs to a group consisting of: chromatic dispersion and fiber nonlinear effects.

40. An optical receiver, comprising:
means for supplying as an output analog representations of real and imaginary parts of a complex waveform that contains information about phase differences between a plurality of time locations in an incoming optical signal that are space by a prescribed amount; and
means for developing (i) a digital representation of an intensity and (ii) a digital representation of a phase profiled and for using the both of said profiles together to reconstruct a digital version of the complex optical field of said incoming optical signal.

41. The invention as defined in claim 40 wherein said means for supplying comprises two orthogonal optical delay interferometers.

42. A method for use in an optical receiver, comprising the steps of
developing an analog representation of real and imaginary parts of a complex waveform that contains information about phase differences between a plurality of time locations in an optical signal that is incoming to said optical receiver, said locations being spaced by a prescribed amount;
converting said analog representation to a digital representations;
developing, as a function of said digital representation, (i) a digital representation of an intensity profiled and (ii) an digital representation of a phase profile;
sing the both of said profile together to reconstruct a digital version of the complex optical field of said incoming optical signal and
supplying an output indicating information represented by said incoming optical signal.

43. The invention as defined in claim 42 wherein said supplying step further comprises the step of compensating said digital representation for at least one transmission impairment inflicted on said received optical signal by a channel over which said incoming optical signal had traveled.

44. The invention as defined in claim 1 wherein said phase profile for the received signal is developed within an uncertainty of only a constant phase shift.

45. The invention as defined in claim 1 wherein said phase profile for said incoming optical signal is developed within an insignificant phase shift.

46. The invention as defined in claim 1 wherein said phase profile is an absolute phase profile for said incoming optical signal.

47. The invention as defined in claim 1 wherein said phase profile is an absolute phase profile for said incoming optical signal that is derived having a constant phase shift as its only uncertainty.

48. The invention as defined in claim 1 wherein said phase profile is an absolute phase profile for incoming optical signal that is derived having an insignificant phase shift as its only uncertainty.

49. An optical receiver, comprising
- a direction differential detection receiver, said direction differential detection receiver configured to receive an incoming optical signal as an input and to supply as an output analog representations of real and imaginary parts of a complex waveform that contains information about phase differences between a plurality of time location in said incoming optical signal that are spaced by a prescribed amount; and
- a signal processor, coupled to said direction differential detection receiver, the signal processor being configured to develop a digital representation of an intensity and phase profile and to use said profiles to reconstruct a digital version of the complex optical field of said incoming optical signal.

50. An optical receiver, comprising
- means for supplying as an output analog representations of real and imaginary parts of a complex waveform that contains information about phase difference between a plurality of time locations in an incoming optical signal that are spaced by a prescribed amount; and
- means for developing a digital representation of an intensity and phase profile and for using the both of said profiles to reconstruct a digital version of the complex optical field of said incoming optical signal.

51. A method for use in an optical receiver, comprising the steps of
- developing an analog representation of real and imaginary parts of a complex waveform that contains information about phase differences between a plurality of time locations in an optical signal that is incoming to said optical receiver, said locations being spaced by a prescribed amount;
- converting said analog representation to a digital representation;
- developing, as a function of said a digital representation, a digital representation of an intensity and a phase profile from which a digital version of the complex optical field of said incoming optical signal is able to be reconstructed; and
- supplying an output indicating information represented by said incoming optical signal.

\* \* \* \* \*